United States Patent [19]
Komarnitskiy

[11] Patent Number: 6,116,194
[45] Date of Patent: Sep. 12, 2000

[54] PET CLEAN-UP BAG ARRANGEMENT

[76] Inventor: Igor A. Komarnitskiy, 228 Bay 34th St., Brooklyn, N.Y. 11214

[21] Appl. No.: 09/274,131

[22] Filed: Mar. 22, 1999

[51] Int. Cl.[7] .................................................... A01K 23/00
[52] U.S. Cl. ............................................................ 119/867
[58] Field of Search .................................... 119/867, 868, 119/869

[56] References Cited

U.S. PATENT DOCUMENTS

| | | | |
|---|---|---|---|
| 4,444,152 | 4/1984 | Berardo | 119/867 |
| 4,893,587 | 1/1990 | Bailey, Jr. | 119/867 |
| 5,355,836 | 10/1994 | Vallery | 119/867 |

*Primary Examiner*—Thomas Price
*Attorney, Agent, or Firm*—Lawrence G. Fridman

[57] ABSTRACT

The litter clean-up bag arrangement consisting of a resilient elongated base member and a bag having a front open end and a rear closed end. The front end of the bag includes an engaging bottom portion and a top portion. The engaging bottom portion is anchored to the elongated base member and the top portion is formed with a flap having opening. The flap is movable between a first position blocking the open end and a second position unblocking the open end of the bag. In use, the base member forms a retaining loop with interior adapted to support the front end of the bag and a handle portion. In the second position, while the front end of the bag is unblocked, the opening of the flap engages the handle portion.

7 Claims, 4 Drawing Sheets

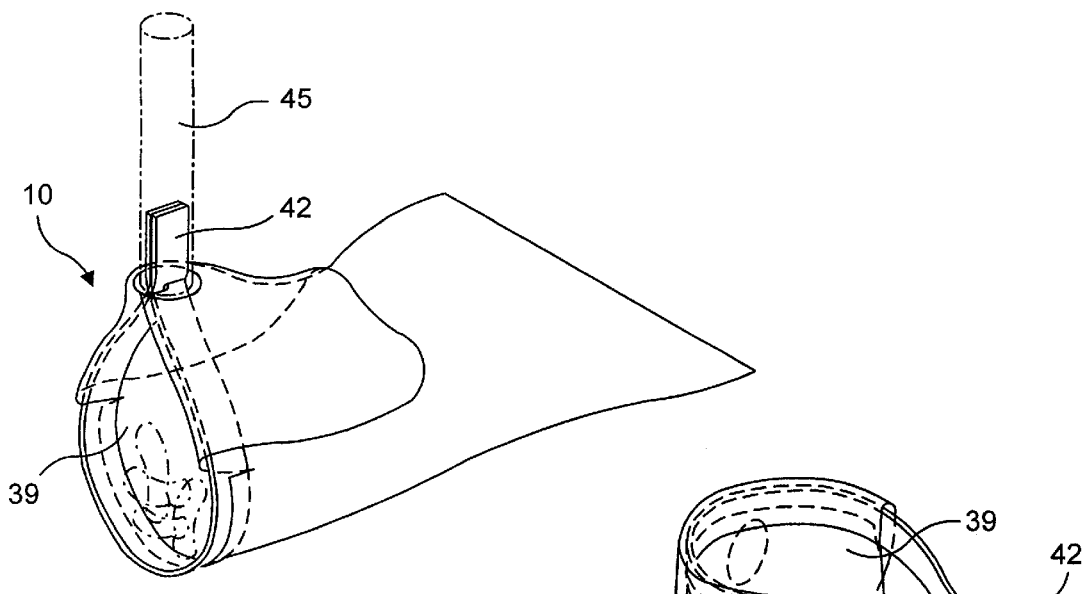
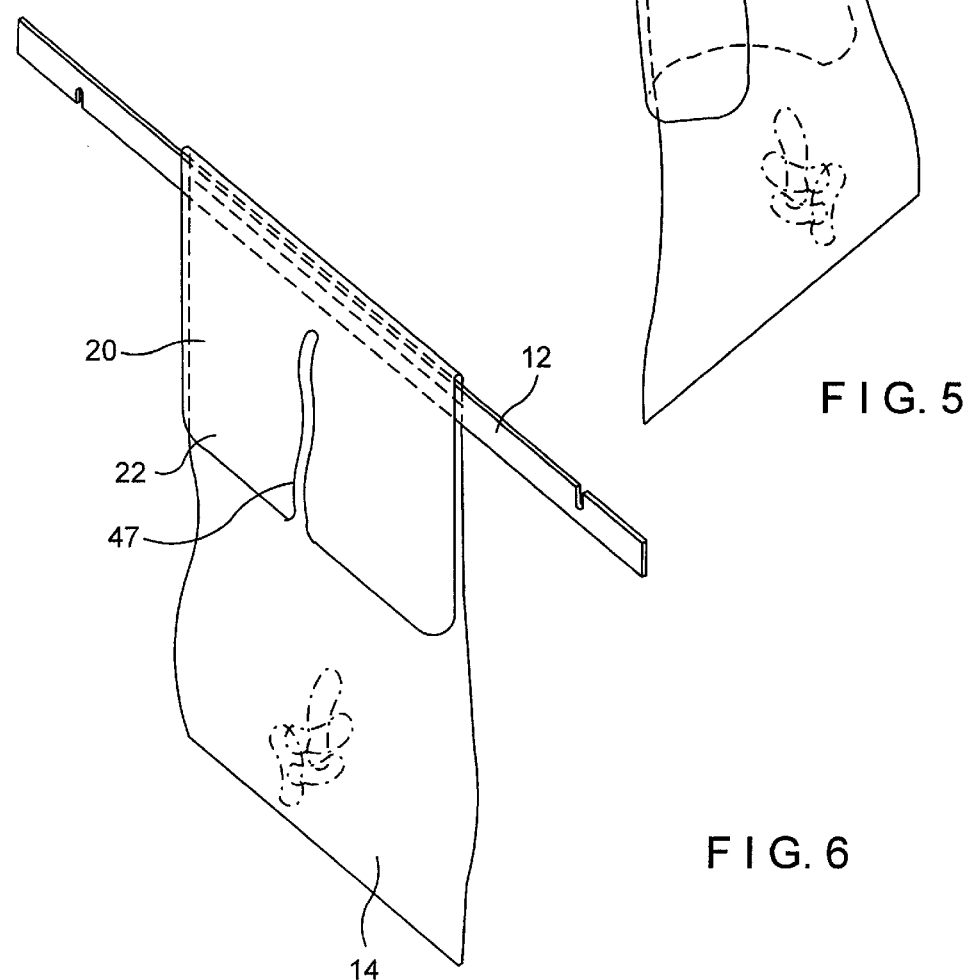
FIG. 4
FIG. 5
FIG. 6

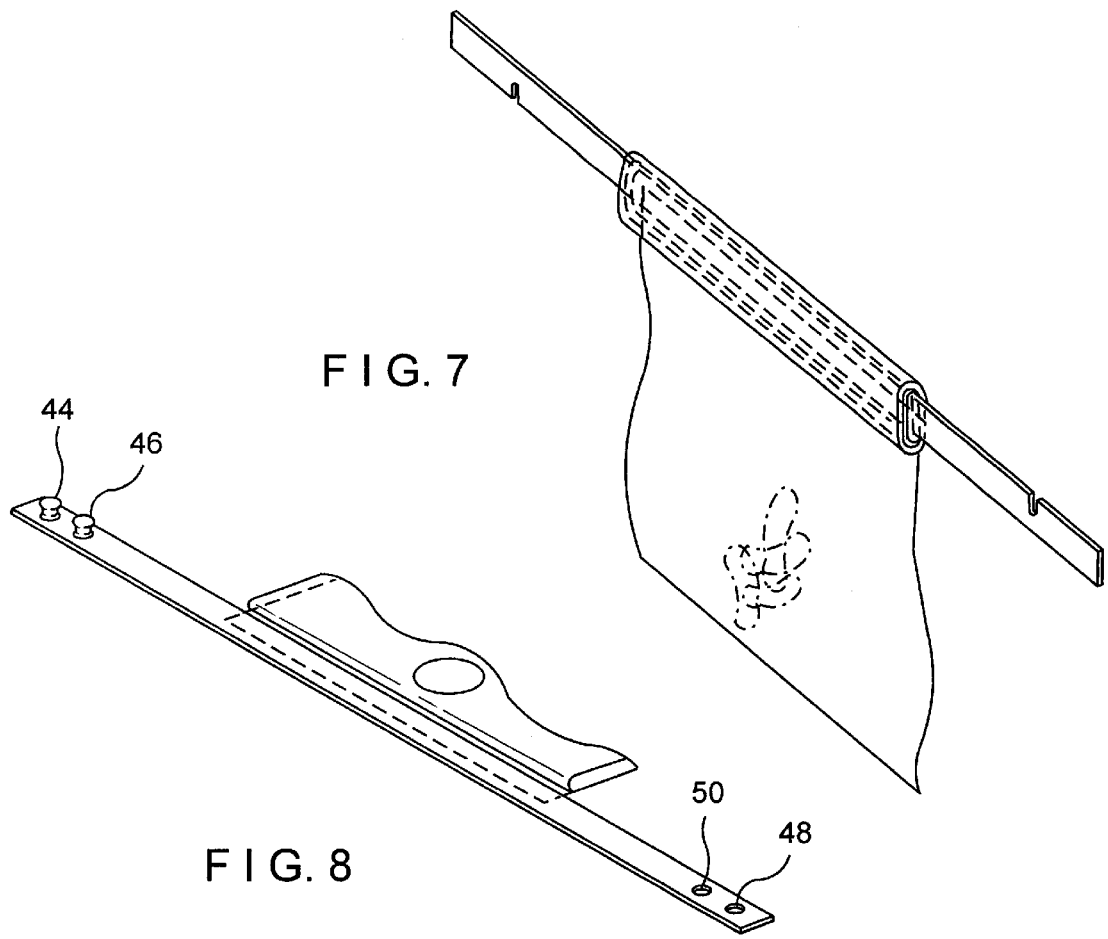
FIG. 7
FIG. 8
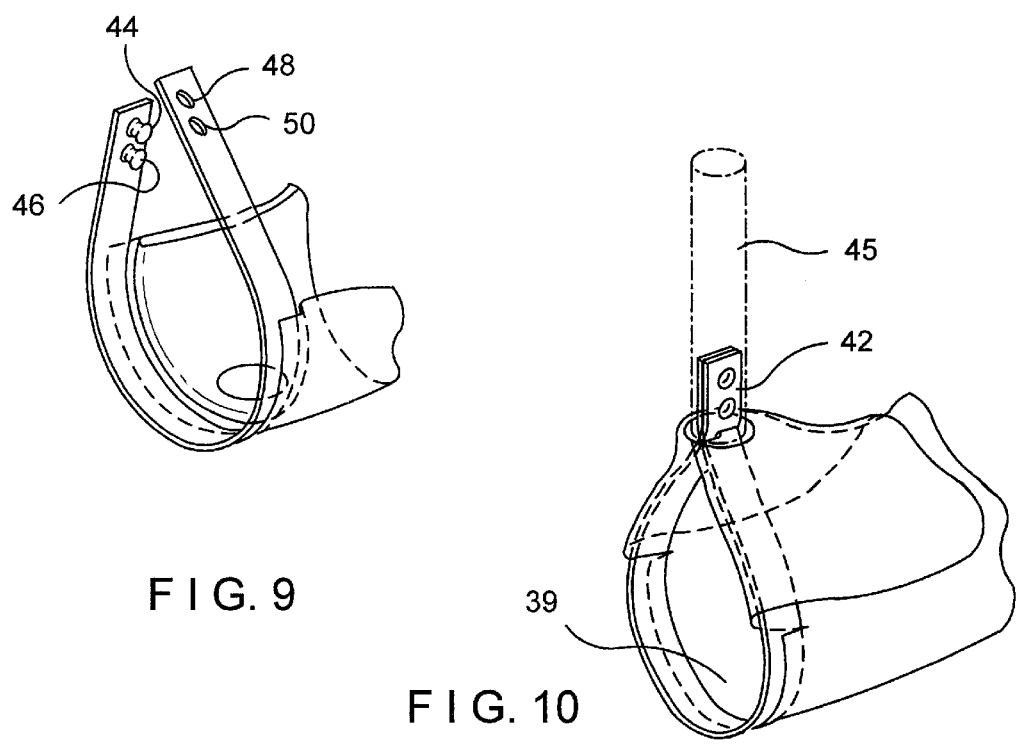
FIG. 9
FIG. 10

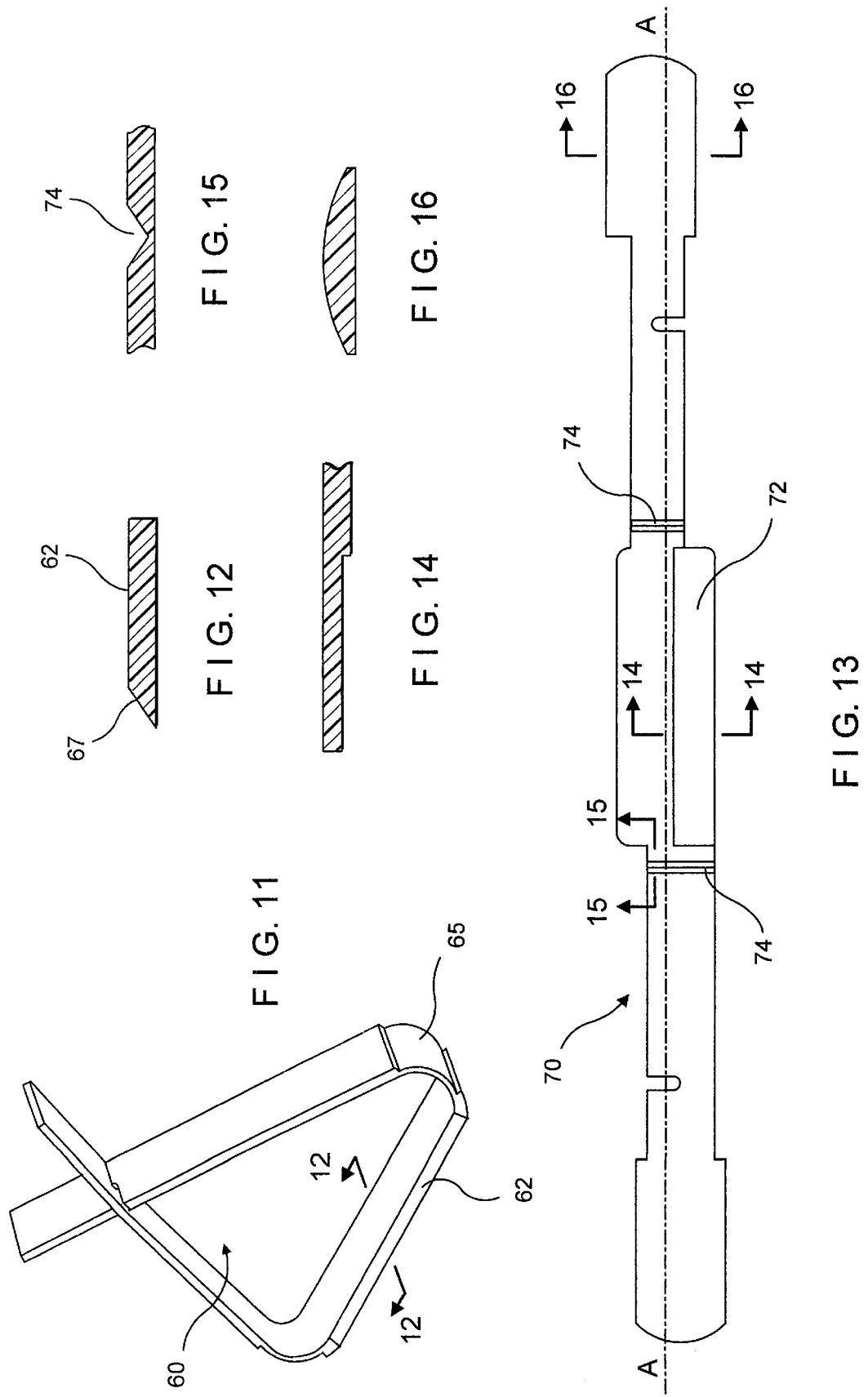

6,116,194

PET CLEAN-UP BAG ARRANGEMENT

FIELD OF THE INVENTION

The invention relates to sanitary devices in general and more particularly, it relates to pet clean-up bag arrangements.

BACKGROUND OF THE INVENTION

The need for cleanliness confirmed by the current regulations in many municipalities require that a person must clean-up after his or her dog's litter. A substantial fine is often imposed on a person neglecting such cleanup. This has resulted in proliferation of devices and techniques adapted for such clean-up purposes. These devices are typically in the form of scoops or shovels, or are arrangements adapted to facilitate the use of bags for the pickup of litter.

Plastic bags have found increasing use as collectors and receptacles for dog's litter. In certain applications, such bags are filled by manually retaining the bag mouths in a vertical plane and sweeping or raking the litter into the bag mouth.

In order to facilitate bag filling, numerous concepts have been advanced for maintaining the mouth of the bag in the open position, so that the operator may focus his or her attention on placing the litter into the bag rather than on maintaining the bag in the desired position for filling. However, these concepts fail in one or more of the following aspects: requiring the use of special arrangements for supporting the bag, employing relatively complex and therefore often expensive parts and components and requiring manual manipulation to support the bag mouth in the open position.

Further, most typical drawbacks of the prior art devices for clean-up of dog litter are: such devices are cumbersome and inconvenient to carry, the devices become soiled with dog feces upon use and must be cleaned requiring hands of a user to be in contact with the feces and such devices are aesthetically unpleasant.

Thus, it has been a long felt and unsolved need for a simple and inexpensive litter clean-up bag arrangement which does not require manual manipulation to support the bag mouth in the open position, a bag arrangement which is convenient to carry around and which is aesthetically pleasant.

SUMMARY OF THE INVENTION

One aspect of the invention provides a litter clean-up bag arrangement comprising a resilient elongated base member and a bag having a front open end and a rear closed end. The front open end has an engaging bottom portion and a top portion with the engaging bottom portion being connected to the elongated base member. The top portion of the bag is formed with a flap capable of extending outwardly beyond the engaging bottom portion. The flap has opening means and is movable between a first position blocking the open end of the bag and a second position unblocking the open end. In use, the resilient elongated base member forms a retaining loop with a receiving portion accommodating the front end of the bag and a handle portion extending outwardly from the receiving portion and adapted for positioning in the hands of an operator. In the second position, while the front end of the bag is unblocked, the opening means of the flap engages the handle portion.

According to another aspect of the invention, the opening means can be either an aperture provided or can be formed as a slot passing through the central area of the flap.

According to a further aspect of the invention, a resilient elongated base member is a substantially flat element formed with connecting means adapted for connecting the ends of the base member, so as to define the handle portion upon formation of the retaining loop. The connecting means includes a plurality of pairs of mutually engaging notches. First notches are provided in the vicinity of the one end of the base member, facing one direction, whereas the second engaging notches are provided at the other end of the base member facing the opposite direction. Thus, in the assembled condition, the first and second notches engage each other forming the retaining loop and the handle portion.

As to still another aspect of the invention, the flap includes a distal and proximal ends, and the bottom engaging portion of the front end of the bag is connected to the elongated base member in such a manner that initially the distal end of the flap faces a rear closed end of the bag and upon formation of the retaining loop and prior to engagement with the handle, the distal end of the flap is moved forwardly, so as to face the direction opposite to that of the rear closed end of the bag.

BRIEF DESCRIPTION OF THE DRAWINGS

Other advantages and features of the invention are described with reference to exemplary embodiments, which are intended to explain and not to limit the invention, and are illustrated in the drawings in which:

FIG. 4 shows a litter clean-up bag arrangement of one embodiment of the invention in an assembled condition with a flap unblocking the bag mouth;

FIG. 5 shows the litter clean-up bag arrangement of the invention with the flap blocking the bag mouth and covering an outer edge of a base member, FIG. 6 shows the litter clean-up bag arrangement in disassembled condition with the flap closing the bag mouth;

FIG. 7 shows the litter clean-up bag arrangement in a further closed condition prior to its disposal;

FIG. 8 shows another embodiment of a litter clean-up bag arrangement in a flat disassembled condition;

FIG. 9 shows an intermediary assembled position thereof;

FIG. 10 shows the litter clean-up bag arrangement of FIG. 8 in the assembled condition;

FIG. 11 shows another embodiment of the base member;

FIG. 12 is a cross-sectional view taken along section line-12 of FIG. 11;

FIG. 13 is a further embodiment of the base plate;

FIG. 14 is a section view taken along a section line 14—14 of FIG. 13:

FIG. 15 is a section view taken along a section line 15—15 of FIG. 13; and

FIG. 16 is a section view taken along a section line 16—16 of FIG. 15.

DESCRIPTION OF THE PREFERRED EMBODIMENT

Figure 1:
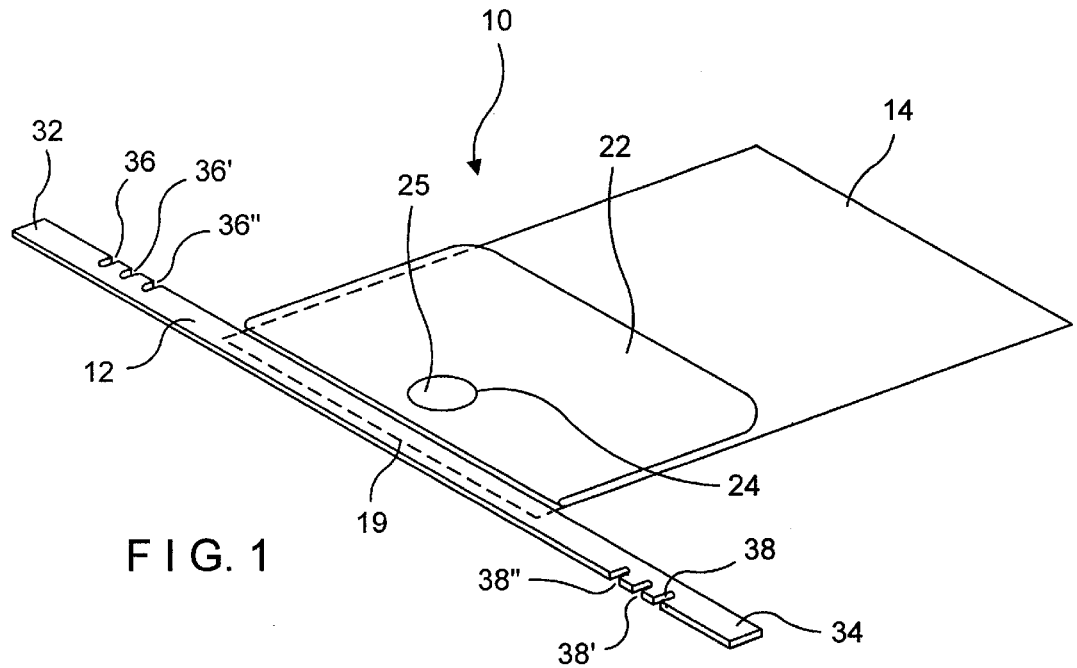
FIG. 1 is a plan view of one embodiment of a litter clean-up bag arrangement of the invention in a flat condition.

Referring now to FIGS. 1–7, wherein one embodiment of a litter clean-up bag arrangement 10 of the invention is best illustrated. The bag arrangement 10 typically consists of an elongated resilient base member 12 and a bag 14. The base member, is generally a flat strip of a resilient material extending between one end 32 and the other end 34. The width of the base member 12 is enough to provide sufficient space for anchoring of the bag.

Figure 3:
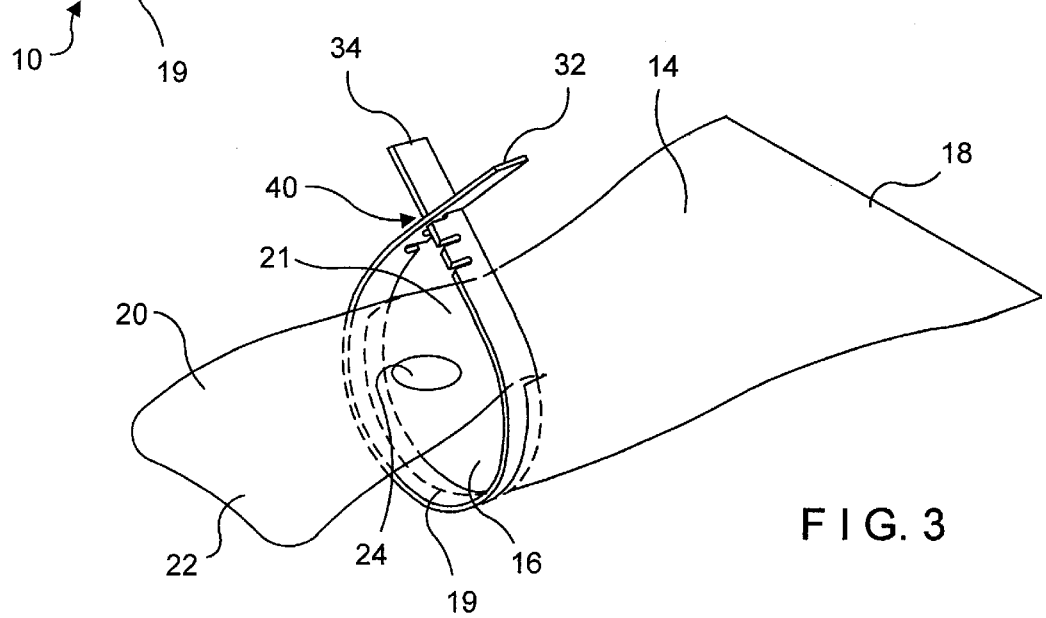
FIG. 3 is a further intermediary assembled view thereof.

The bag 14 is typically formed with a mouth or front open end 16 and a rear closed end 18. As best illustrated in FIGS. 3–5, the mouth or front open end consists of an engaging bottom portion 19 and a top portion 21 formed with a flap 20 of substantial length. The bag 14 by any conventional means, is permanently or temporarily anchored to the base member 12 through the engaging bottom portion 19. In one position of the invention (see FIG. 3), a distal end 22 of the flap can extend outwardly substantially beyond the engaging bottom portion 21.

The flap 20 is formed with an opening arrangement 25. As best illustrated in FIGS. 1–3 and 8, the opening arrangement 25 can be in the form of an aperture 24 centrally positioned within the flap. However, the opening arrangement can be of any conventional configuration. For example, as shown in FIG. 6, it can be in the form of a slit 47 extending through the central portion of the flap to the distal end 22.

The base member 12 is formed with an engaging arrangement 40 adapted for retaining the ends 32 and 34 in the engaged condition and facilitating formation of the retaining loop 39. In the embodiment of FIGS. 1–7, the engaging arrangement 40 is in the form of plurality of pairs first engaging notches 36 36' 36" and second engaging notches 38, 38', 38" provided in the vicinity of the respective ends 32 and 34 of the base member. To facilitate mutual engagement, the first and second notches face opposite directions. Each notch extends inwardly to about half width of the base member.

Figure 2:
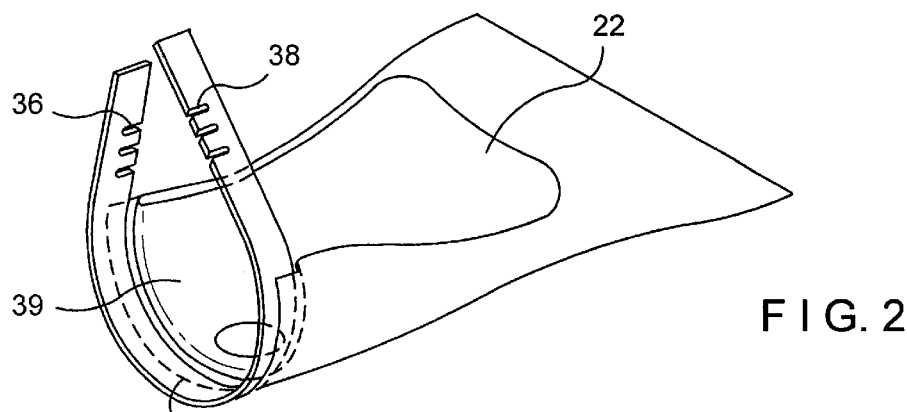
FIG. 2 is an intermediary assembled view thereof.

As best illustrated in FIGS. 2 and 3, in order to place the bag arrangement of the invention into a working condition, the base member 12 is bent, so as to form a retaining loop 39.

During the assembly of the bag arrangement, engagement of the notches facilitate formation of a handle portion adapted for convenient positioning in hands of a user. Although, in this embodiment of the invention the engaging arrangement 40 consists of the corresponding pairs of the first and second engaging notches; nevertheless, any conventional means of engaging the ends of the base member together leading to the formation of the retaining loop and handle portion is within the scope of the invention. For example, the engaging arrangement can be in the form of by multiple pairs of pins 44, 46 extending outwardly from one end of the base member and adapted for engagement with corresponding openings 48, 50 provided at the other end thereof.

It is further understood that any conventional means of forming the retaining loop and keeping the ends of the base member together to define the handle portion 42 is contemplated. For example, the ends of the base member can be kept together by an adhesive.

During the assembly of the litter clean-up bag arrangement 10 of the invention, the base member 12 is bent to form a retaining loop 39. In this condition, in one embodiment of the invention (See FIGS. 1–7), the first notch 36 and the corresponding second notch 38 are placed into mutual engagement. Thus, the handle portion 42 is formed by the joined ends 32, 34 of the base member extending outwardly from the point of mutual engagement. In view of the resiliency of the material used in manufacturing of the base member, the ends 32 and 34 are conveniently brought together forming a handle portion 42 adapted to be directly or indirectly positioned in the hands of a user and to facilitate manipulation of the bag arrangement.

In the operation of the invention after formation of the retaining loop 39, the flap 20 is movable between a first position blocking the mouth or front open end 16 of the bag and a second position unblocking the mouth. As illustrated in FIGS. 1 and 2, initially, the flap 20 extends rearwardly along the bag 14. In this condition, the mouth 16 of the bag is unblocked.

Upon formation of the retaining loop 38 and the handle portion 42 (see FIG. 3), the flap is moved forwardly within the loop, so that its distal end 22 is positioned substantially outwardly and beyond the engaging portion of the base member 12. To facilitate operation of the bag arrangement and prevent unnecessary contact between the litter and the bag, the flap 20 is conveniently moved upwardly, so as to enable the handle portion 42 to pass through and engage the aperture 24 substantially limiting further motion of the flap (see FIG. 4). In this condition, the mouth or front end 16 of the bag is widely open and operatively supported through its anchoring with the resilient base member 12 forming the retaining loop 39. The flap 20 is retained by means of its engagement with the handle portion 42 in an upward position unblocking the mouth of the bag.

After the litter is picked up, the flap is moved upwardly, enabling the aperture 24 to disengage the handle portion 42. Upon disengagement, the flap 20 extends forwardly over the base member 12, covering its outer edge and preventing unnecessary contacts between hands of a user and parts of the bag arrangement dirtied by dog feces.

It is appreciated that the bag of invention provides a degree of adjustabiltiy as to the interior dimensions of the retaining loop 39 and the sizes of the utilized bags. Such adjustability often results from using various pairs of the engaging notches as well as from the utilization of other forms of the adjustable engaging arrangement contemplated by the invention.

To facilitate operation of the litter clean-up bag arrangement of the invention, the length of the handle portion 42 can be increased by means of an extension element 45. The extension element 45 can be in the form of substantially hollow member. In this respect, FIG. 4 illustrates the extension element 45 formed as a cylindrical hollow member engaging the handle portion 42 of the retaining loop 39. Such extension hollow elements can be used when the engaging notches are utilized in the formation of the retaining loop, as well as with other forms of the engaging arrangement. For example, FIG. 10 illustrates use of the hollow extension element in connection with the embodiment of the invention in which the engaging arrangement is in the form of the plurality of pin-opening pairs 44, 46, 48, 50.

Referring now to FIGS. 11 and 12, wherein another embodiment of the retaining loop 60 of the invention is illustrated. The triangular shaped retaining loop 60 is formed in a manner similar to the above discussed embodiment shown in FIGS. 1–7. To facilitate formation of the triangular shaped retaining loop, the thickness of the base member 62 at the places of bending 65 has been reduced. To facilitate litter pick up, the outer edge 67 of the base member 62 which is exposed to the litter during operation of the invention has a wedge shaped configuration (see FIG. 12).

Further variation of the base member 70 having preformed handles positioned at both ends thereof is illustrated in FIGS. 13–16. A central area 72 of the base member adapted for anchoring of the bag has a reduced thickness. To facilitate bending of the base member and formation of the retaining loop arrangement, a pair of transverse grooves 74 is provided. The preformed handles are not symmetrical with respect to the longitudinal axis of the base member A—A.

The clean-up arrangement of the invention has the advantage of being adaptable to receive a variety of bag sizes. To simplify shipping and handling, the bag arrangement of the invention is readily collapsible to a flat condition. (see FIGS. 1, 6, 8).

The clean-up bag arrangement of the invention is used with the bag preferably made of a plastic such as polyethylene of other polyolefin. The bags can be also made of paper, fabric or non-woven material, provided the cost is relatively low.

The base members may be manufactured from any resilient low-cost material which can be easily formed and attached to the bag by any conventional means including adhesives, heat, etc. The base member can be made of stiff cardboard, fiberglass, or plastic. Ideally, the base member is attached to the bag during manufacture. However, connecting of the bag to the base member prior to formation of the retaining loop is also contemplated. The width and thickness of the base members should be the minimum to achieve just enough stiffness and strength to support the bag in an open condition and provide enough space for anchoring of the bag.

To use the clean-up bag arrangement of the invention one needs only to form a retaining loop by bending the base member and opening the mouth of the bag. In this condition the flap is upwardly positioned and retained through the engagement of the opening arrangement and the handle. The engaging portion of the base member is placed on the ground adjacent to the litter. While the bag is held open and pressed to the ground in this manner, the litter is pushed into it. The bag arrangement is then closed by using the flap which blocks the bag mouth. The bag and contents are then disposed of the nearest trash barrel.

What is claimed is:

1. A litter clean-up bag arrangement, comprising:
   a resilient, elongated base member;
   a bag comprising at least a front open end and a rear closed end, said front open end having an engaging bottom portion and a top portion, said engaging bottom portion being anchored to said elongated base member, said top portion formed with a flap capable of extending outwardly substantially beyond said engaging bottom portion, said flap having opening means and being movable between a first position blocking said open end of the bag and a second position unblocking said open end;
   said resident elongated base member forming a retaining loop with a receiving portion supporting said front end of the bag and a handle portion extending outwardly from the receiving portion, said handle portion being adapted for convenient positioning in hands of an operator, in said second position while said front end of the bag being unlocked a distal end of the flap is retained in an upward position through engagement of said opening means with said handle portion.

2. The litter clean-up bag arrangement of claim 1, wherein said opening means is an aperture provided in the flap.

3. The litter clean-up bag arrangement of claim 1, wherein said opening means is an elongated slot passing through said flap.

4. The litter clean-up bag arrangement of claim 1, wherein said resilient elongated base member is a substantially flat element formed with connecting means adapted for connecting the ends of the base member so as to define the handle portion upon formation of the retaining loop.

5. The litter clean-up bag arrangement of claim 4, wherein said connecting means consists of at least one pair of first and second engaging notches, said first engaging notch being provided in the vicinity of one end of the base member facing one direction, whereas the second engaging notch being provided at the other end of the base member facing the opposite direction, so that in the assembled condition said first and second engaging notches engage each other forming said handle portion.

6. The litter clean-up bag arrangement of claim 1, wherein said flap further includes a distal end proximal ends, said bottom engaging portion of the front end of the bag being anchored to said resilient elongated base member in such a manner that initially said distal end of said flap faces a rear closed end of the bag, and upon formation of said retaining loop and prior to engagement with the handle portion the distal end of the flap is moved forwardly so as to face the direction opposite to that of the rear closed end of the bag.

7. The litter clean-up bag arrangement of claim 6, wherein upon disengagement of the flap and the handle portion the flap is positioned over the base member, so as to cover an outer edge of the base member and preventing the user from touching said base member.

* * * * *